(12) United States Patent
Tao

(10) Patent No.: US 10,270,381 B2
(45) Date of Patent: Apr. 23, 2019

(54) INTELLIGENT POWER CONTROL SYSTEM AND METHOD FOR ELECTRIC MOTORS, AND UNMANNED AERIAL VEHICLE (UAV) HAVING THE SAME

(71) Applicant: SZ DJI TECHNOLOGY CO., LTD., Shenzhen (CN)

(72) Inventor: Ye Tao, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 43 days.

(21) Appl. No.: 15/487,577

(22) Filed: Apr. 14, 2017

(65) Prior Publication Data

US 2017/0222594 A1    Aug. 3, 2017

Related U.S. Application Data

(63) Continuation of application No. PCT/CN2014/088914, filed on Oct. 20, 2014.

(51) Int. Cl.
*H02P 29/028* (2016.01)
*G05D 23/19* (2006.01)
(Continued)

(52) U.S. Cl.
CPC .......... *H02P 29/028* (2013.01); *B64C 39/024* (2013.01); *G05D 23/1917* (2013.01);
(Continued)

(58) Field of Classification Search
CPC ... H02P 29/028; H02P 9/024; G05D 23/1917; B64C 39/024; B64C 2201/042; B64C 2201/024; B64C 2201/108; H02K 11/25
See application file for complete search history.

(56) References Cited

U.S. PATENT DOCUMENTS

| 2014/0179535 | A1 | 6/2014 | Stückl | |
| 2015/0048772 | A1* | 2/2015 | Nagata | G05B 6/02 318/634 |
| 2015/0329204 | A1* | 11/2015 | Nelson | B64C 27/26 244/6 |

FOREIGN PATENT DOCUMENTS

| CN | 102135453 A | 7/2011 |
| CN | 102541113 A | 7/2012 |

(Continued)

OTHER PUBLICATIONS

The World Intellectual Property Organization (WIPO) International Search Report for PCT/CN2014/088914 dated May 29, 2015 8 Pages.

*Primary Examiner* — Yonel Beaulieu
*Assistant Examiner* — Martin A Weeks
(74) *Attorney, Agent, or Firm* — Anova Law Group, PLLC

(57) ABSTRACT

The present invention discloses an intelligent power control system for driving UAV motors comprising: a motor temperature reading unit, a processing unit and a motor power output controlling unit. The motor-temperature reading unit may be configured for reading a temperature of at least one motor mounted in the UAV. The processing unit may be configured for comparing whether the read temperature exceeds a first particular temperature, and controlling the motor power output controlling unit to adjust dynamically allowed maximum output power of various motors according to a comparison result. The present invention is also related to an intelligent power control system for driving UAV motors, and a UAV utilizing the intelligent power control system for driving UAV motors.

20 Claims, 4 Drawing Sheets

(51) Int. Cl.
*H02K 11/25* (2016.01)
*B64C 39/02* (2006.01)
*H02P 29/024* (2016.01)
*H02P 29/60* (2016.01)

(52) U.S. Cl.
CPC ............ *H02K 11/25* (2016.01); *H02P 29/024* (2013.01); *H02P 29/60* (2016.02); *B64C 2201/024* (2013.01); *B64C 2201/027* (2013.01); *B64C 2201/042* (2013.01); *B64C 2201/108* (2013.01)

(56) References Cited

FOREIGN PATENT DOCUMENTS

| | | |
|---|---|---|
| CN | 202295294 U | 7/2012 |
| CN | 202647108 U | 1/2013 |
| CN | 103095213 A | 5/2013 |
| CN | 103359284 A | 10/2013 |
| CN | 203827230 U | 9/2014 |
| DE | 102011105880 A1 | 12/2012 |

* cited by examiner

INTELLIGENT POWER CONTROL SYSTEM AND METHOD FOR ELECTRIC MOTORS, AND UNMANNED AERIAL VEHICLE (UAV) HAVING THE SAME

CROSS-REFERENCE TO RELATED APPLICATION

This is a continuation application of International Application No. PCT/CN2014/088914, filed on Oct. 20, 2014, the entire contents of which are incorporated herein by reference.

TECHNICAL FIELD

The present invention relates to an intelligent power control system and method for driving electric motors of an unmanned aerial vehicle, and an unmanned aerial vehicle having the same.

BACKGROUND OF THE INVENTION

Electric motors are increasingly becoming an important part of the propulsion of an unmanned aerial vehicle (UAV). Due to the load-carrying limitation of the UAV, the UAV motors need to reach a power density as high as possible, meanwhile ensuring absolute system reliability. High power density may often need higher density of current in windings of the motors or bring larger iron loss, which all may cause more heat. High system reliability may require an operating temperature of the system to be as low as possible, and the operating temperature is never allowed to exceed a safe temperature threshold. Otherwise, the motor may be damaged due to overheat, or even be burnt. In the past, in order to achieve one of the two such objectives, the other one is often sacrificed. For example, the system reliability may be achieved by increasing a capacity of a motor, which often sacrifices the power density.

Some existing protective fractions against overheating are simply to turn off the whole motor, causing failure of a part or all of the systems in the UAV, or even UAV crash in severe conditions.

Current technologies often uses two basic approaches: (1) sacrificing one of the power density and high reliability while optimizing the other. For example, a high power density is achieved by scarifying a part of the reliability. Alternatively, for high reliability, a motor with larger capacity is used or the power of an existing motor is intentionally limited, scarifying high power density. (2) When the motor temperature reaches a certain upper limit, the motor is simply turned off for protection. However, in UAV applications, turning off the motor may often bring unacceptable consequences.

SUMMARY OF THE DISCLOSURE

The main technical problems to be solved by the present invention include to provide an intelligent power control system and method for driving UAV motors as well as a UAV that have high power density and high reliability.

In order to solve the above-described technical problems, a technical solution adopted by the present invention is to provide an intelligent power control system for driving UAV motors. The intelligent power control system includes a motor temperature reading unit, a processing unit and a motor power output controlling unit. The motor temperature reading unit may be configured for reading a temperature of at least one motor mounted in the UAV, the processing unit may be configured for comparing whether the read temperature exceeds a first particular temperature, and controlling the motor power output controlling unit to dynamically adjust allowed maximum output power of a plurality of motors according to a comparison result.

In some embodiments, when the UAV has a plurality of motors, the motor temperature reading unit may read temperatures of the plurality of motors respectively, when at least one of the read temperatures exceeds the first particular temperature, the processing unit may control the motor power output controlling unit to reduce correspondingly allowed maximum output power of the motor whose temperature exceeds the first particular temperature.

In some embodiments, when the UAV has a plurality of motors, the motor temperature reading unit may read a temperature of one of the motors, when the read temperature exceeds the first particular temperature, the processing unit may control the motor power output controlling unit to reduce simultaneously allowed maximum output power of the plurality of motors.

In some embodiments, when the UAV has a plurality of motors, the motor temperature reading unit may read temperatures of the plurality of motors, when one of the read temperatures exceeds the first particular temperature, the processing unit may control the motor power output controlling unit to reduce simultaneously allowed maximum output power of the plurality of motors.

In some embodiments, when the temperature of any one of the motors is decreased to be less than or equal to a second particular temperature, the processing unit may control the motor power output controlling unit to increase allowed maximum output power of the plurality of motors.

In some embodiments, the second particular temperature may be less than the first particular temperature.

In some embodiments, the processing unit may dynamically adjust allowed maximum output power of various motors by controlling upper limits of current of the plurality of motors.

In some embodiments, the processing unit may dynamically adjust allowed maximum output power of plurality of motors by controlling upper limits of voltage of the plurality of motors.

In order to solve the above-described technical problems, a technical solution adopted by the present invention is an intelligent power control method for driving UAV motors. The intelligent power control method includes reading a temperature of at least one motor; comparing whether the temperature of the at least one motor exceeds a first particular temperature; and adjusting dynamically power of various motors according to a comparison result.

In some embodiments, when the UAV has a plurality of motors, temperatures of the plurality of motors may be read respectively; when at least one of the read temperatures exceeds the first particular temperature, allowed maximum output power of the motor whose temperature exceeds the first particular temperature may be reduced correspondingly.

In some embodiments, when the UAV has a plurality of motors, when the read temperature exceeds the first particular temperature, allowed maximum output power of the plurality of motors may be reduced simultaneously.

In some embodiments, when the UAV has a plurality of motors, temperatures of the plurality of motors may be read respectively; when one of the read temperatures exceeds the first particular temperature, allowed maximum output power of the plurality of motors may be reduced simultaneously.

In some embodiments, when the temperature of any one of the motors is decreased to be less than or equal to a second particular temperature, allowed maximum output power of various motors may be increased.

In some embodiments, allowed maximum output power of a motor may be less than a maximum power of the motor.

In some embodiments, the power of the plurality of motors may be adjusted dynamically by controlling upper limits of current of the plurality of motors.

In some embodiments, the power of the plurality of motors may be adjusted dynamically by controlling upper limits of voltage of the plurality of motors.

In some embodiments, the temperature of the at least one motor may be calculated by detecting in real time a resistance of windings of the at least one motor; and calculating according to a curve of temperature versus resistance of materials of conducting wires.

In some embodiments, the temperature of the at least one motor may be obtained by providing a temperature sensor within the motor.

In order to solve the above-described technical problems, a technical solution adopted by the present invention is a UAV. The UAV includes a casing; a plurality of arms each of which is connected with the casing; a propulsion device disposed at the arms and configured for driving flight of the aerial vehicle, the propulsion device including at least one motor; a motor power output controlling unit; a processor electrically connected with the propulsion device; and at least one temperature detecting device configured for detecting a temperature of the at least one motor in real time. The processor is configured for reading the temperature of the at least one motor sensed by the at least one temperature detecting device, and comparing whether the read temperature exceeds a first particular temperature to generate a comparison result, and controlling the motor power output controlling unit to dynamically adjust allowed maximum output power of the at least one motor according to the comparison result.

In some embodiments, the UAV may have a plurality of motors and a plurality of temperature detecting devices, the number of the motors an d the number of the temperature detecting devices may be the same various temperature detecting devices may sense in real time temperatures of various motors respectively, when at least one of the temperatures read by the processor exceeds the first particular temperature, the processor may reduce correspondingly allowed maximum output power of the motor whose temperature exceeds the first particular temperature.

In some embodiments, the UAV may have a plurality of motors and one temperature detecting device mounted in one motor of the plurality of motors, the temperature detecting device may sense the temperature of the one motor, the processor may read the temperature of the one motor, when the read temperature exceeds the first particular temperature, the processor may control to reduce allowed maximum output power of the plurality of motors simultaneously.

In some embodiments, the UAV may have a plurality of motors and a plurality of temperature detecting devices, the number of the motors and the number of the temperature detecting devices may be the same, various temperature detecting devices may sense temperatures of various motors respectively, when at least one of the read temperatures exceeds the first particular temperature, the processor may control to reduce allowed maximum output power of the plurality of motors simultaneously.

In some embodiments, when the temperature of the at least one motor is decreased to be less than or equal to a second particular temperature, the processor may control to increase the allowed maximum output power of various motors.

In some embodiments, the second particular temperature may be less than the first particular temperature.

In some embodiments, the processor may adjust dynamically power of the plurality of motors by controlling upper limits of current or voltage of the plurality of motors.

In some embodiments, the temperature detecting device may be a temperature sensor.

In some embodiments, the temperature detecting device can detect in real time a resistance of windings of the motor, and calculate a temperature according to a curve of temperature versus resistance of materials of conducting wires.

In some embodiments, the UAV may further comprise a gimbal and a load carried thereon, and the gimbal may be configured for implementing a fixation of the load, adjusting an attitude of the load at will and holding the load stably at a determined attitude.

In some embodiments, the load may be an imaging device.

In some embodiments, the arms may be hollow arm-like and in communication with an inner cavity of the casing, the processor may further comprise at least one driver disposed within the arms and electrically connected with the at least one motor, and a main controller, the driver may be configured for receiving a control signal from the processor to adjust a rotating speed of the at least one motor.

In some embodiments, the propulsion device may further comprise a rotor mounted at the at least one motor and configured for driving a flight of the UAV under the driving of the at least one motor.

In some embodiments, the arms and the casing may be formed respectively, and fixedly connected in a way of locking by a locking member or soldering.

In some embodiments, the arms may be capable of being folded relative to the casing.

In some embodiments, a flight indicator lamp may be provided on each of the arms, the light indicator lamp may be configured for indicating a flight status of the UAV.

In some embodiments, the flight indicator lamp uses a quick flashing yellow light to indicate the UAV; the flight indicator lamp uses a slow flashing red light to indicate a low battery alert; the flight indicator lamp uses a quick flashing red light to indicate a serious low battery alert; the flight indicator lamp uses alternating flashing of red and yellow lights to indicate that there is an error on data of a compass and calibration is needed; and the flight indicator lamp uses a slow flashing green light to indicate that a safe flight is available.

In some embodiments, the flight indicator lamp may be an LED.

In some embodiments, a lower end of the casing may be connected with a foot bracket, which may be fixedly connected at the lower end of the casing by a fastening member.

Accordingly, the disclosed embodiment may have certain advantageous effects. For example, the processing unit of the intelligent power control system for driving UAV motors in accordance with the present disclosure may be configured for comparing whether the read temperature exceeds a first particular temperature, and controlling the motor power output controlling unit to adjust dynamically power of various motors according to a comparison result. Therefore, the intelligent power control system for driving UAV motors of the present invention may implement both the unification

DETAILED DESCRIPTION OF THE INVENTION

The technical solutions of the present invention will be described below in combination with the accompanying drawings. It should be apparent that embodiments described herein are only a part rather than all of the embodiments of the present invention. Other embodiments obtained by those with ordinary skills in the art on the basis of the embodiments of the present invention without inventive efforts should fall within the protection scope of the present invention.

Figure 1:
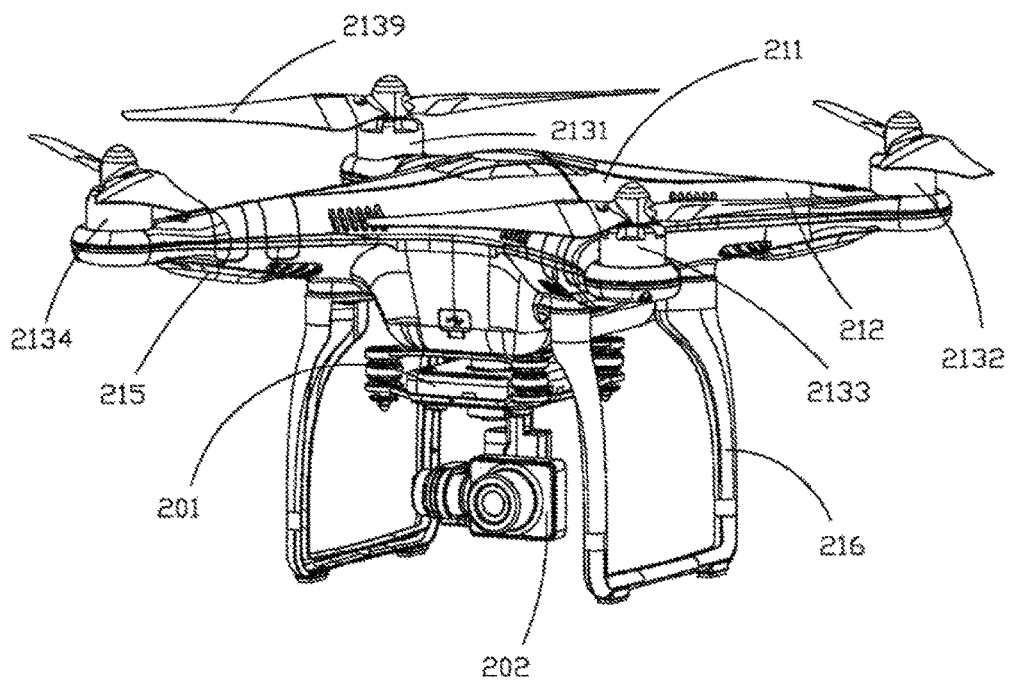
FIG. 1 illustrates a perceptive view of a UAV in accordance with an embodiment of the present invention.
Figure 2:
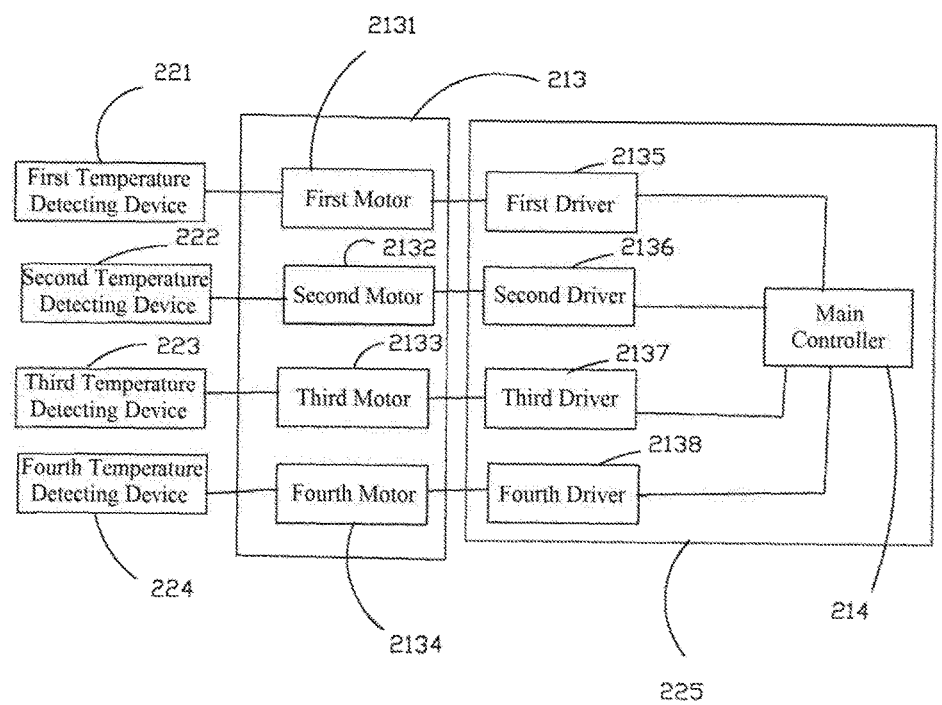
FIG. 2 illustrates a functional block diagram of a UAV in accordance with an embodiment of the present invention.

Referring to FIG. 1 to FIG. 2, according to some embodiments of the present invention, an unmanned aerial vehicle (UAV) 200 may be provided. The UAV 200 may be used as an auxiliary device for video shooting, photographing, monitoring, and sampling, etc., and may be air-based (for example, a rotary-wing aerial vehicle or a fixed-wing aerial vehicle), water-based (for example, a submarine or a ship), road-based (for example, motor vehicles), or space-based (for example, a satellite, a space station or a spaceship) or the like.

The UAV 200 may include a gimbal 201 and a load 202 carried thereon. The gimbal 201 may be used to implement fixation of the load 202, to adjust the posture of the load 202 at will (for example, altering an altitude, an inclination angle, and/or a direction of the load), and to hold the load 202 stable at a determined posture. The load 202 may be an imaging device, such as a camera, a video camera and the like.

The UAV 200 may also include a hollow casing 211, four arms 212, each of which is connected with the casing 211, a propulsion device 213 disposed on the arms 212 for providing propulsion to the flight of the UAV 200, and a processor 225. The arms 212 may be in a hollow arm-like shape or any other suitable shape, and in communication with an inner chamber of the casing 211. The processor 225 may include any hardware processor(s) or controller(s) for implementing various control functions to control various components of the UAV 200.

The propulsion device 213 may include a first motor 2131, a second motor 2132, a third motor 2133, a fourth motor 2134, and four rotors 2139 that are respectively mounted on the first motor 2131, the second motor 2132, the third motor 2133, and the fourth motor 2134. Each of the rotors 2139 may have two blades, three blades or the like. The rotors 2139 may be driven by the first motor 2131, the second motor 2132, the third motor 2133, and the fourth motor 2134 to provide flight propulsion for the UAV 200. In some embodiments, the first motor 2131, the second motor 2132, the third motor 2133, and the fourth motor 2134 are brushless electric motors.

The processor 225 may include a first driver 2135, a second driver 2136, a third driver 2137, a fourth driver 2138, and a main controller 214. The first driver 2135 is disposed in one of the arms 212 and electrically connected with the first motor 2131, the second driver 2136 is disposed in one of the arms 212 and electrically connected with the second motor 2132, the third driver 2137 is disposed in one of the arms 212 and electrically connected with the third motor 2133, and the fourth driver 2138 is disposed in one of the arms 212 and electrically connected with the fourth motor 2134. The main controller 214 may provide various control functions over the drivers to drive the motors.

The first driver 2135, the second driver 2136, the third driver 2137 and the fourth driver 2138 may be used for controlling rotational speeds of the first motor 2131, the second motor 2132, the third motor 2133 and the fourth motor 2134, respectively. The first driver 2135, the second driver 2136, the third driver 2137 and the fourth driver 2138 may each be electrically connected with the main controller 214 for receiving a control signal thereof to adjust correspondingly rotational speeds of the first motor 2131, the second motor 2132, the third motor 2133 and the fourth motor 2134.

Since there is no need to expose the first driver 2135, the second driver 2136, the third driver 2137 and the fourth driver 2138 outside, the first driver 2135, the second driver 2136, the third driver 2137 and the fourth driver 2138 may be disposed within the arms 212 in a factory. The casing 211 and arms 212 may provide protection for the first driver 2135, the second driver 2136, the third driver 2137, and the fourth driver 2138. Thus, the UAV 200 may have good strength and rigidity, and may be well adapted for transportation and storage. The UAV 200 may be "ready to use at hand" without self assembling and debugging by a user, facilitating the usage by the user, greatly reducing the professional requirement for the user, avoiding installation errors by the user, avoiding damaging the UAV such as vehicle exploding and the like, and improving the reliability of the UAV 200.

In some embodiments, the arms 212 and the casing 211 may be formed integrally or fixedly connected. The arms 212 and the casing 211 being formed integrally may mean that the arms 212 and the casing 211 may be manufactured integrally in a suitable way, such as by injection molding and the like. Of course, the arms 212 and the casing 211 may be formed individually, and then fixedly connected by fasteners or by soldering, etc. The fasteners may be a screw and so on.

It can be understood that the number of the arms 212, drivers and motors may be the same, and are not limited to four as shown in FIG. 1 and FIG. 2.

In addition to the description of the above-described structures, in other embodiments, the arms 212 and the casing 211 may be movably connected. In a specific application, the arms 212 may be wholly rotatably connected on the casing 211, and the arms 212 may be folded relative to the casing 211. While not in use, the arms 212 may be folded, so it may be easy to deposit and carry the UAV. While in use, the arms 212 may be unfolded and fixed.

In other embodiments, the first driver 2135, the second driver 2136, the third driver 2137, and the fourth driver 2138 may be disposed within the casing 211.

In some embodiments, the four arms 212 may be arranged in a "X" shape or a cross "+" shape, and connected to the casing 211. In a specific application, using the central axis of the casing 211 as the center of a circle, the arms 212 may be distributed circumferentially and evenly around the casing 211 taking the, the number of the arms 212 may be adjusted as required.

In the present embodiment, each one of the arms 212 may be provided with a flight indicator lamp 215 thereon, the flight indicator lamp 215 may be an LED and set according to the UAV 200, facilitating to know a flight status of the UAV 200. For example, a yellow light quick flashing may be used to indicate or denote the UAV 200; a red light slow flashing may denote a low battery alert; a red light quick flashing may denote a serious low battery alert; red and yellow lights flashing alternately may denote that there is an error on data of a compass and a calibration is needed; a green light slow flashing may denote a safe flight is available, and so on.

A foot bracket 216 may be connected with a lower end of the casing 211, and fixedly connected to the lower end of the casing 211 by a fastening member which may be a screw and the like. The foot bracket 216 may be used for supporting the casing 211, the gimbal 201, the load 202 and the like.

The UAV 200 may also include tour temperature detecting devices, for example, a first temperature detecting device 221, a second temperature detecting device 222, a third temperature detecting device 223 and a fourth temperature detecting device 224. In the present embodiment, the first temperature detecting device 221, the second temperature detecting device 222, the third temperature detecting device 223 and the fourth temperature detecting device 224 may each be temperature sensors, disposed within the first motor 2131, the second motor 2132, the third motor 2133 and the fourth motor 2134, respectively, and configured for sensing temperatures of the first motor 2131, the second motor 2132, the third motor 2133 and the fourth motor 2134, respectively.

It can be understood that, in other embodiments, the temperature detecting device(s) may be provided within one, two or three of the motors.

It can be understood that, the UAV 200 may obtain temperatures of the first motor 2131, the second motor 2132, the third motor 2133 and the fourth motor 2134 by other ways. For example, the temperature detecting devices may detect the resistance of windings of the first motor 2131, the second motor 2132, the third motor 2133 and the fourth motor 2134 in real time, and calculate temperatures according to a curve of temperature versus resistance of materials of conductive wires.

Figure 3:
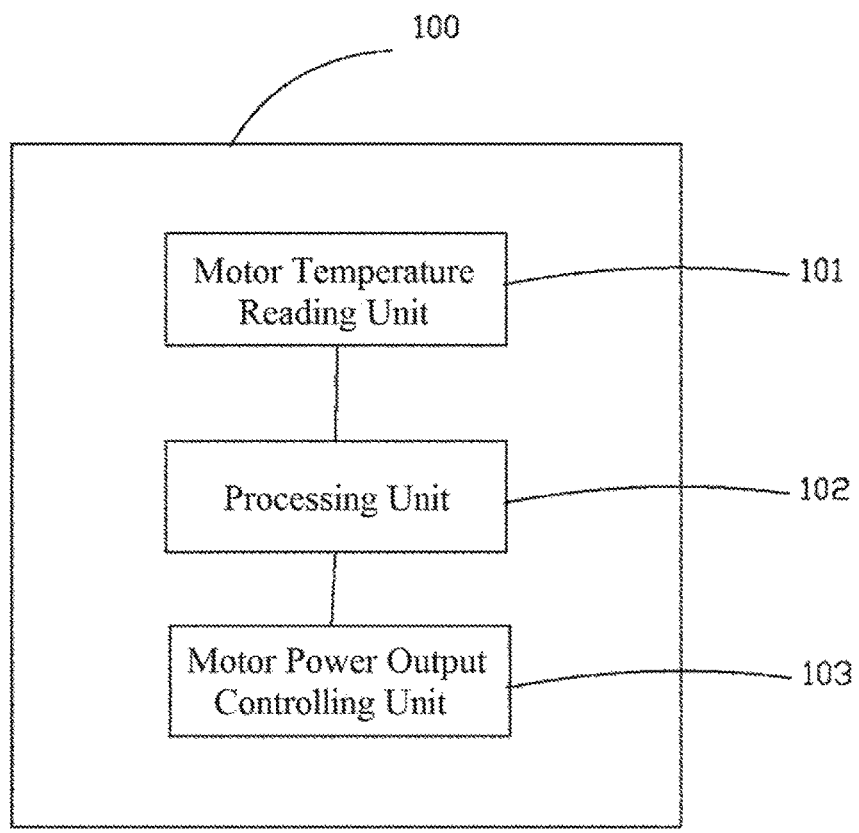
FIG. 3 illustrates a functional module diagram of an intelligent power control system for driving UAV motors in accordance with an embodiment of the present invention.

Referring to FIG. 3, an intelligent power control system 100 for driving UAV motors in accordance with certain embodiments may be disposed in a UAV for driving UAV electric motors. The intelligent power control system 100 for driving UAV motors may include a motor temperature reading unit 101, a processing unit 102, and a motor power output controlling unit 103.

The motor temperature reading unit 101 may be configured for reading a temperature of the first motor 2131 acquired by the first temperature detecting device 221, a temperature of the second motor 2132 acquired by the second temperature detecting device 222, a temperature of the third motor 2133 acquired by the third temperature detecting device 223, and a temperature of the fourth motor 2134 acquired by the fourth temperature detecting device 224. In the present embodiment, since four temperature detecting devices 221, 222, 223 and 224 are provided, the motor temperature reading unit 101 may read respectively real time temperatures of various motors 2131, 2132, 2133 and 2134 acquired by the four temperature detecting devices 221, 222, 223 and 224. In other embodiments, one temperature detecting device may be provided in one of the four motors 2131, 2132, 2133 and 2134, therefore the motor temperature reading unit 101 may read only the temperature of the one temperature detecting device. When only two or three of the four motors 2131, 2132, 2133 and 2134 are provided with a temperature detecting device, the motor temperature reading unit 101 may read the temperature sensed by each temperature detecting device.

The processing unit 102 may be configured for dynamically adjusting allowed maximum output power of various motors according to the temperature(s) of at least one of the motors 2131, 2132, 2133 and 2134 read by the motor temperature reading unit 101. Specifically, the processing unit 102 may compare the temperatures of the motors 2131, 2132, 2133 and 2134 with a first particular temperature (for example, but not limited to, approximately 60° C.), when any one or more of the read temperatures of various motors 2131, 2132, 2133 and 2134 exceeds the first particular temperature, the processing unit 102 may control the motor power output controlling unit 103 to accordingly reduce the allowed maximum output power of the motor whose temperature exceeds the first particular temperature.

Specifically, because output power of the first motor 2131, the second motor 2132, the third motor 2133, and the fourth motor 2134 vary in real time, the processing unit 102 may dynamically adjust the allowed maximum output power of the first motor 2131, the second motor 2132, the third motor 2133 and the fourth motor 2134 by controlling the motor power output controlling unit 103 to reduce upper limits of current of the various motors. For example, the motor power output controlling unit 103 may reduce the upper limit of current from an original 0.5 ampere to a 0.3 ampere, thereby effectively controlling heating power of the first motor 2131, the second motor 2132, the third motor 2133 and the fourth motor 2134, assuring the safety of the various motors 2131, 2132, 2133 and 2134. It can be understood that, the allowed maximum output power of the various motors may also be adjusted dynamically by controlling upper limits of voltage of the motors.

When a temperature of any one or more of the motors is decreased to be less than or equal to a second particular temperature, the processing unit 102 may control the motor power output controlling unit 103 to increase moderately an upper limit of current of the motor whose temperature exceeds the first particular temperature, for example, to restore to the original upper limit of current of 0.5 ampere. The second particular temperature may be less than the first particular temperature. For example, in one embodiment, the second particular temperature may be, but not limited to, approximately 40° C., so as to make the first motor 2131, the second motor 2132, the third motor 2133 and the fourth motor 2134 obtain higher power densities.

It can be understood that, in certain other embodiments, when the UAV 200 has a plurality of motors and one temperature detecting device mounted within one of the plurality of motors, the one temperature detecting device may sense a temperature of the one motor, and the motor temperature reading unit 101 may read the temperature of the one of the plurality of motors. When the read temperature exceeds the first particular temperature, the processing unit 102 may control the motor power output controlling unit 103 to reduce the allowed maximum output power of the various motors 2131, 2132, 2133 and 2134 simultaneously.

It can be understood that, in certain other embodiments, the UAV 200 has four motors and four temperature detecting devices for sensing temperatures of the plurality of motors respectively. However, as long as a temperature of one of the motors reaches the first particular temperature, the processing unit 102 may control the motor power output controlling unit 103 to reduce allowed maximum output power of the motors 2131, 2132, 2133 and 2134 simultaneously. Further, when two or three of the motors are each provided with one temperature detecting device, as long as the temperature of one of the motors reaches the first particular temperature, the processing unit 102 may control the motor power output controlling unit 103 to reduce the allowed maximum output power of the first motor 2131, the second motor 2132, the third motor 2133 and the fourth motor 2134 simultaneously.

It can be understood that, the first particular temperature and the second particular temperature may be designed as required by specific applications, and not limited to the disclosed embodiments.

Figure 4:
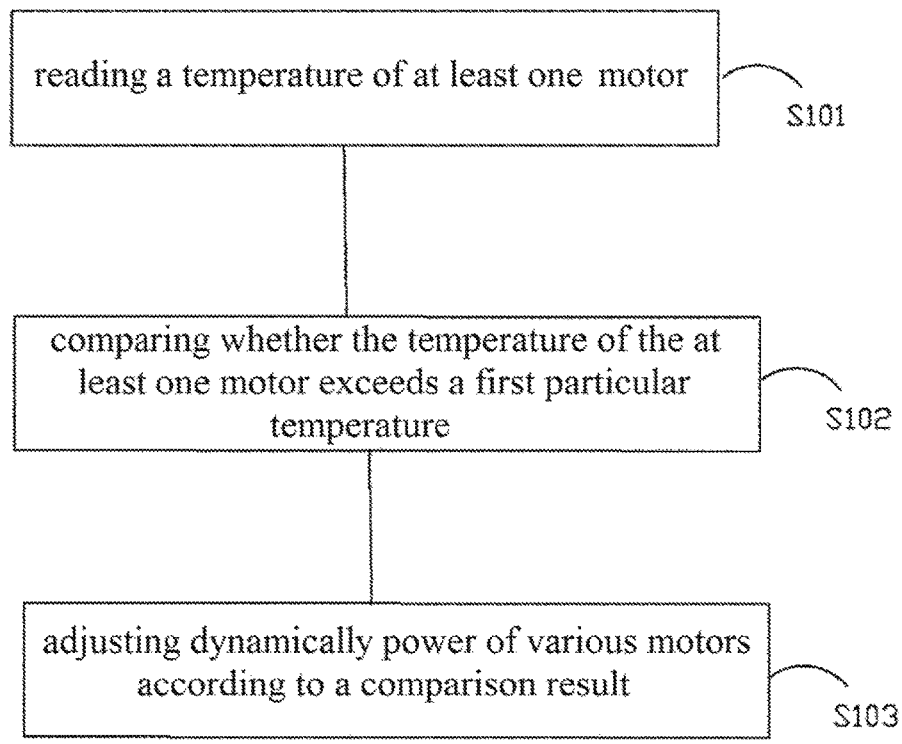
FIG. 4 illustrates a flow chart of an intelligent power control method for driving UAV motors in accordance with an embodiment of the present invention.

Referring to FIG. 4, an intelligent power control method for driving UAV motors may include the following steps:

S101: reading a temperature of at least one motor. The UAV 200 may include four temperature detecting devices, for example, a first temperature detecting device 221, a second temperature detecting device 222, a third temperature detecting device 223 and a fourth temperature detecting device 224. In one embodiment, the first temperature detecting device 221, the second temperature detecting device 222, the third temperature detecting device 223 and the fourth temperature detecting device 224 may each be temperature sensors, disposed within the first motor 2131, the second motor 2132, the third motor 2133 and the fourth motor 2134, respectively. Further, the first temperature detecting device 221, the second temperature detecting device 222, the third temperature detecting device 223 and the fourth temperature detecting device 224 may configured for sensing in real time temperatures of the first motor 2131, the second motor 2132, the third motor 2133 and the fourth motor 2134, respectively. The motor temperature reading unit 101 may be configured for reading the temperature of the first motor 2131 sensed in real time by the first temperature detecting device 221, the temperature of the second motor 2132 sensed in real time by the second temperature detecting device 222, the temperature of the third motor 2133 sensed in real time by the third temperature detecting device 223, and the temperature of the fourth motor 2134 sensed in real time by the fourth temperature detecting device 224.

S102: comparing whether the temperature of the at least one motor exceeds a first particular temperature. For example, the processing unit 102 may compare the temperatures of the motors 2131, 2132, 2133 and 2134 with the first particular temperature (for example, but not limited to, approximately 60° C.).

S103: dynamically adjusting power of various motors according to a comparison result. Specifically, the processing unit 102 may compare the temperatures of the motors 2131, 2132, 2133 and 2134 with the first particular temperature (for example, but not limited to, approximately 60° C.). When any one or more of the read temperatures of the various motors 2131, 2132, 2133 and 2134 exceeds the first particular temperature, the processing unit 102 may control the motor power output controlling unit 103 to accordingly reduce allowed maximum output power of the motor whose temperature exceeds the first particular temperature.

Specifically, the processing unit 102 may dynamically adjust the allowed maximum output power of the first motor 2131, the second motor 2132, the third motor 2133 and the fourth motor 2134 by controlling the motor power output controlling unit 103 to reduce upper limits of current of the various motors, for example, from original upper limit of current of 0.5 ampere to 0.3 ampere, thereby effectively controlling heating power of the first motor 2131, the second motor 2132, the third motor 2133 and the fourth motor 2134, assuring the safety of the various motors 2131, 2132, 2133 and 2134. It can be understood that, the allowed maximum output power of the various motors may also be dynamically adjusted by controlling upper limits of voltage of the motors.

It can be understood that, in certain other embodiments, when the UAV 200 has a plurality of motors and only one temperature detecting device mounted within one of the plurality of motors, the temperature detecting device may sense a temperature of the one motor with the temperature detecting device, and the motor temperature reading unit 101 may read the temperature of the one of the plurality of motors. When the read temperature exceeds the first particular temperature, the processing unit 102 may control the motor power output controlling unit 103 to reduce the allowed maximum output power of the various motors 2131, 2132, 2133 and 2134 simultaneously.

It can be understood that, in certain other embodiments, the UAV 200 has four motors and four temperature detecting devices for sensing temperatures of the plurality of motors respectively, however, as long as the temperature of one of the motors reaches the first particular temperature, the processing unit 102 may control the motor power output controlling unit 103 to reduce allowed maximum output power of the motors 2131, 2132, 2133 and 2134 simultaneously. Further, while two or three of the motors are each provided with one temperature detecting device, as long as the temperature of one of the motors reaches the first particular temperature, the processing unit 102 may control the motor power output controlling unit 103 to reduce the allowed maximum output power of the first motor 2131, the second motor 2132, the third motor 2133 and the fourth motor 2134 simultaneously.

When a temperature of any one or more of the motors is decreased to be less than or equal to the second particular temperature, the processing unit 102 may control the motor power output controlling unit 103 to increase moderately an upper limit of current of the motor whose temperature exceeds the first particular temperature. For example, processing unit 102 may restore to the original upper limit of current of 0.5 ampere. The second particular temperature may be less than the first particular temperature. In one embodiment, the second particular temperature may be, but not limited to, approximately 40° C., so as to make the first motor 2131, the second motor 2132, the third motor 2133 and the fourth motor 2134 obtain higher power densities.

Through detailed description of the above-described embodiments, it can be understood that, the processing unit of the intelligent power control system for driving UAV motors in accordance with the present disclosure may be configured for comparing whether the read temperature exceeds the first particular temperature, and controlling the motor power output controlling unit to dynamically adjust the power of the various motors according to a comparison result. Therefore, the intelligent power control system for driving UAV motors of the present disclosure may implement both the unification of high power density and the high reliability of a UAV motor, accomplishing intelligent control policy for the UAV motor.

In the several embodiments provided by the present disclosure, it should be understood that, the disclosed intelligent power control system and method for driving UAV motors may be implemented by other ways. The above described embodiments of the intelligent power control system for driving UAV motors are merely illustrative. For example, the division of the modules or units is merely a logic function division, and other division manners may be employed in practical applications. For example, more units or components may be combined or may be integrated into another system. Alternatively, some features may be omitted or not be performed. Additionally, couplings or direct couplings or communication connections between one and another as displayed or discussed may be indirect couplings or communication connections via some interfaces, devices or units, or may be in electric, mechanical or other forms.

Units described as separate parts may or may not be separated physically. Components displayed as units may or may not be physical units, i.e., may be located in one place, or may be distributed onto a plurality of network units. Some or all of the units may be selected in order to achieve the objectives of the solutions of the embodiments according to the actual requirements.

Additionally, various functional units in various embodiments according to the present disclosure may be integrated into one processing unit, or may be physically individual units. Two or more of various functional units may be integrated into one unit, and the integrated unit may be implemented in a form of hardware or in a form of functional units of software.

The integrated unit, if being implemented in a form of functional unit of software and being independent product for sale and use, may be stored in a computer-readable storage medium. Based on such understandings, the technical solution of the present disclosure or the part or all of the technical solution may be embodied in a form of a software product. The software product may be stored in a storage medium, and include several instructions for causing the main controller 214 or various drivers 2135, 2136, 2137, and 2138 of the processor 225 to execute some or all of steps of the methods in various embodiments according to the present disclosure. The above-mentioned storage medium may include: a USB flash disk, a movable hard disc, a Read-Only Memory (ROM), a random access memory (RAM), a diskette or an optical disc and various medium capable of storing program codes.

The foregoing disclosure is merely illustrative of the embodiments of the invention, and is not intended to limit the patentable scope of the invention. Any equivalent structural or flow variations made on the basis of the description and the drawings of the invention, and their direct or indirect application to other relevant technical fields, shall all fall into the patentable scope of the invention.

What is claimed is:

1. An intelligent power control system for driving UAV motors, comprising:
    a motor temperature reading unit;
    a processing unit; and
    a motor power output controlling unit, wherein:
    the motor temperature reading unit is configured for reading a temperature of at least one motor mounted in the UAV, and
    the processing unit is configured for comparing whether the read temperature exceeds a first preset temperature to generate a comparison result, and controlling the motor power output controlling unit to dynamically adjust allowed maximum output power of a plurality of motors according to the comparison result.

2. The intelligent power control system for driving UAV motors of claim 1, wherein:
    the motor temperature reading unit reads temperatures of the plurality of motors respectively; and
    when at least one of the read temperatures exceeds the first preset temperature, the processing unit controls the motor power output controlling unit to correspondingly reduce allowed maximum output power of any motor whose temperature exceeds the first preset temperature.

3. The intelligent power control system for driving UAV motors of claim 1, wherein:
    the motor temperature reading unit reads a temperature of one of the plurality of motors, and
    when the read temperature exceeds the first preset temperature, the processing unit controls the motor power output controlling unit to reduce an allowed maximum output power of each of the plurality of motors simultaneously.

4. The intelligent power control system for driving UAV motors of claim 1, wherein:
    the motor temperature reading unit reads temperatures of the plurality of motors, and
    when one of the read temperatures exceeds the first preset temperature, the processing unit controls the motor power output controlling unit to reduce an allowed maximum output power of each of the plurality of motors simultaneously.

5. The intelligent power control system for driving UAV motors of claim 1, wherein:
    when a temperature of any one of the plurality of motors drops to be less than or equal to a second preset temperature, the processing unit controls the motor power output controlling unit to increase allowed maximum output power of the plurality of motors.

6. The intelligent power control system for driving UAV motors of claim 5, wherein:
    the second preset temperature is less than the first preset temperature.

7. The intelligent power control system for driving UAV motors of claim 1, wherein:
    the processing unit dynamically adjusts allowed maximum output power of the plurality of motors by controlling upper limit of current of the plurality of motors.

8. The intelligent power control system for driving UAV motors of claim 1, wherein:
    the processing unit dynamically adjusts allowed maximum output power of the plurality of motors by controlling upper limit of voltage of the plurality of motors.

9. An intelligent power control method for driving UAV motors, comprising:
    reading a temperature of at least one motor;
    comparing whether the temperature of the at least one motor exceeds a first preset temperature to generate a comparison result; and
    dynamically adjusting power of the at least one motor according to the comparison result.

10. The intelligent power control method for driving UAV motors of claim 9, wherein:
    when the at least one motor includes a plurality of motors, reading temperatures of the plurality of motors are read respectively; and
    when at least one of the read temperatures exceeds the first preset temperature, allowed maximum output power of any motor whose temperature exceeds the first preset temperature is reduced correspondingly.

11. The intelligent power control method for driving UAV motors of claim 9, wherein:
    when the at least one motor includes a plurality of motors, reading a temperature of one of the plurality of motors when the read temperature exceeds the first preset temperature, an allowed maximum output power of each of the plurality of motors is reduced simultaneously.

12. The intelligent power control method for driving UAV motors of claim 9, wherein:
when the at least one motor includes a plurality of motors, reading temperatures of the plurality of motors are read respectively; and
when one of the read temperatures exceeds the first preset temperature, an allowed maximum output power of each of the plurality of motors is reduced simultaneously.

13. The intelligent power control method for driving UAV motors of claim 9, wherein:
when the at least one motor includes a plurality of motors, and a temperature of any one of the plurality of motors drops to be less than or equal to a second preset temperature, allowed maximum output power of the plurality of motors is increased.

14. The intelligent power control method for driving UAV motors of claim 13, wherein:
the second preset temperature is less than the first preset temperature.

15. The intelligent power control method for driving UAV motors of claim 9, wherein:
the at least one motor includes a plurality of motors, and the power of the plurality of motors is adjusted dynamically by controlling upper limit of current of the plurality of motors.

16. The intelligent power control method for driving UAV motors of claim 9, wherein:
the at least one motor includes a plurality of motors, and the power of the plurality of motors are adjusted dynamically by controlling upper limit of voltage of the plurality of motors.

17. The intelligent power control method for driving UAV motors of claim 9, wherein:
the temperature of the at least one motor is calculated by detecting in real time a resistance of windings of the at least one motor, and calculating according to a curve of temperature versus resistance of materials of conducting wires.

18. The intelligent power control method for driving UAV motors of claim 9, wherein:
the temperature of the at least one motor is obtained by providing a temperature sensor within the motor.

19. A UAV, comprising:
a casing;
a plurality of arms connected with the casing;
a propulsion device disposed at the arms, the propulsion device including at least one motor;
at least one temperature detecting device; and
an intelligent power control system coupled to and driving the at least one motor, the intelligent power control system including:
a motor temperature reading unit;
a processing unit; and
a motor power output controlling unit, wherein:
the motor temperature reading unit is configured for reading a temperature of the at least one motor mounted in the UAV, and
the processing unit is configured for comparing whether the read temperature exceeds a first preset temperature to generate a comparison result, and controlling the motor power output controlling unit to dynamically adjust allowed maximum output power of a plurality of motors according to the comparison result.

20. The UAV of claim 19, wherein:
the at least one motor includes a plurality of motors, the at least one temperature detecting device includes a plurality of temperature detecting devices, and a total number of the plurality of motors is same as a total number of the plurality of temperature detecting devices;
the plurality of temperature detecting devices sense in real time temperatures of the plurality of motors respectively; and
when at least one of the temperatures exceeds the first preset temperature, the processor reduces correspondingly allowed maximum output power of any motor whose temperature exceeds the first preset temperature.

* * * * *